United States Patent [19]

Kajiyama

[11] Patent Number: 5,404,308
[45] Date of Patent: Apr. 4, 1995

[54] NUMERICAL CONTROL (NC) DEVICE TO CONTROL FEED SPEED OF TOOL BASED ON SPEED OF SPINDLE AND AMOUNT OF CHANGE OF SPINDLE SPEED

[75] Inventor: Makoto Kajiyama, Yamanashi, Japan

[73] Assignee: Fanuc Ltd., Yamanashi, Japan

[21] Appl. No.: 39,196

[22] Filed: Apr. 13, 1993

[30] Foreign Application Priority Data

Sep. 12, 1991 [JP] Japan .................. 3-232752

[51] Int. Cl.⁶ ............ G06F 15/46; G05B 13/02; G05B 19/407
[52] U.S. Cl. ................ 364/474.3; 364/164; 364/174; 318/568.18; 318/571; 318/595
[58] Field of Search ............ 364/174, 474.3, 474.15, 364/474.11, 474.28, 474.29, 474.32, 474.34, 474.33, 167.01, 164, 165; 318/571, 696, 567, 39, 654, 563, 569, 595, 570, 560, 600, 561, 11, 625, 568, 220, 568.18, 616

[56] References Cited

U.S. PATENT DOCUMENTS

| | | | |
|---|---|---|---|
| 4,086,517 | 4/1978 | Yamaki et al. | 318/39 |
| 4,093,904 | 6/1978 | Burig et al. | 318/616 |
| 4,096,770 | 6/1978 | Tanner | 318/571 |
| 4,173,786 | 11/1979 | Kuhnell et al. | 318/571 |
| 4,353,018 | 10/1982 | Kohzai et al. | 318/571 |
| 4,789,943 | 12/1988 | Yamanaka et al. | 364/474.28 |
| 4,879,660 | 11/1989 | Asakura et al. | 364/474.15 |
| 5,051,913 | 9/1991 | Kume et al. | 364/474.28 |
| 5,101,143 | 3/1992 | Eba | 318/11 |
| 5,105,137 | 4/1992 | Iijima | 318/568.230 |
| 5,117,368 | 5/1992 | Yamaguchi et al. | 364/474.32 |
| 5,144,214 | 9/1992 | Komatsu et al. | 318/600 |
| 5,184,053 | 2/1993 | Maruo et al. | 318/571 |
| 5,267,142 | 11/1993 | Kono et al. | 364/167.01 |

FOREIGN PATENT DOCUMENTS

| | | |
|---|---|---|
| 61-117049 | 6/1986 | Japan . |
| 63-251121 | 10/1988 | Japan . |
| 64-58425 | 3/1989 | Japan . |
| 3-142131 | 6/1991 | Japan . |

Primary Examiner—James Trammell
Attorney, Agent, or Firm—Staas & Halsey

[57] ABSTRACT

An numerical control (NC) device capable of machining a workpiece with high accuracy by accurately commanding a feed speed of a tool, even if a sudden change occurs in an actual speed of a spindle motor. If a rotational speed of a spindle changes, a change amount calculation/storage device calculates and stores a change amount on the basis of the rotational speed already detected. A rotational speed detected by a rotational speed detection device is corrected thereafter according to the change amount, and a proper feed speed is commanded from a feed speed control device. If thread cutting is carried out by employing the NC device, the tool feed speed is commanded in proportion to the actual speed of the spindle motor, and therefore, even though the rotational speed of the spindle motor is lowered at the moment the workpiece is started to be subjected to thread cutting by the tool, a move command signal with a proper tool feed speed is outputted.

2 Claims, 3 Drawing Sheets

NUMERICAL CONTROL (NC) DEVICE TO CONTROL FEED SPEED OF TOOL BASED ON SPEED OF SPINDLE AND AMOUNT OF CHANGE OF SPINDLE SPEED

BACKGROUND OF THE INVENTION

1. Field of the Invention

The present invention relates to an NC device, and in particular, to a numerical control (NC) device capable of commanding a tool feed speed for machining a workpiece in accordance with an actual speed of a spindle motor.

2. Description of the Related Art

When executing thread cutting with an NC lathe, a tool feed speed to be commanded from an NC device is calculated on the basis of a rotational speed of a spindle motor transmitted from a position coder or the like, and a thread pitch width commanded by a program. Namely, in the NC device, assuming that a rotational speed of a spindle motor is S (rpm), and a pitch width of thread is P (mm), a tool feed speed command F (mm/s) is obtained by the following equation:

$$F = S \times (1/60) \times P$$

Therefore, if the rotational speed S of the spindle motor is lowered in some degree, the tool feed speed is lowered in proportion to the rotational speed S. Generally, in the NC device, the workpiece can be machined in accordance with the tool feed speed which is commanded synchronously with the actual speed of spindle motor for rotating the workpiece, so that a pitch width commanded by a program can be always maintained in the thread cutting.

However, in the NC device, data is exchanged between the NC device and a servo side each time an interpolation signal ITP is generated. For this reason, a delay occurs in operations of signal input-output, and hence even if the rotational speed S of the spindle motor changes in a certain ITP cycle, the ITP cycle being specified by the NC device, it is difficult to create a command for changing the tool feed speed in such a manner that the command can follow the motor speed change. Further, when a great torque is suddenly applied to the spindle motor, e.g., at the beginning of thread cutting, the rotational speed is suddenly lowered. For this reason, when the workpiece is subject to thread cutting effected by the tool, an error occurs in a command value F for the tool feed speed at the moment the tool contacts with the workpiece, and therefore, the thread pitch width becomes large during the period where such an error is found.

As mentioned above, according to the conventional NC device, a delay time occurs in the tool feed speed command for machining the workpiece, and for this reason, there is a problem that machining accuracy for the workpiece is lowered.

SUMMARY OF THE INVENTION

The present invention has been made in view of the above circumstances, and an object of the present invention is to provide an NC device capable of machining a workpiece with high accuracy by accurately commanding a tool feed speed even if sudden changes occur in an actual speed of a spindle.

To solve the above problem, according to the present invention, in an NC device where a feed speed of a tool for machining a workpiece is commanded synchronously with an actual speed of a spindle for rotating the workpiece, there is provided an NC device which comprises detection means for detecting a rotational speed of the spindle, calculation/storage means for calculating and storing an amount of change in the rotational speed detected by said detection means when the rotational speed has changed, and feed speed control means for controlling the feed speed of the tool on the basis of data obtained by correcting the rotational speed detected by said detection means in accordance with the amount of change in the rotational speed of the spindle.

According to the present invention, if the rotational speed changes, the calculation/storage means calculates and stores an amount of change on the basis of the rotational speed already detected. Thereafter, the detected rotational speed is corrected in accordance with the amount of change, whereby a proper feed speed can be commanded from the feed speed control means, even if a delay time occurs in commanding the tool feed speed.

DETAILED DESCRIPTION OF THE PREFERRED EMBODIMENTS

An embodiment of the present invention will be hereinafter described with reference to the drawings.

Figure 1:
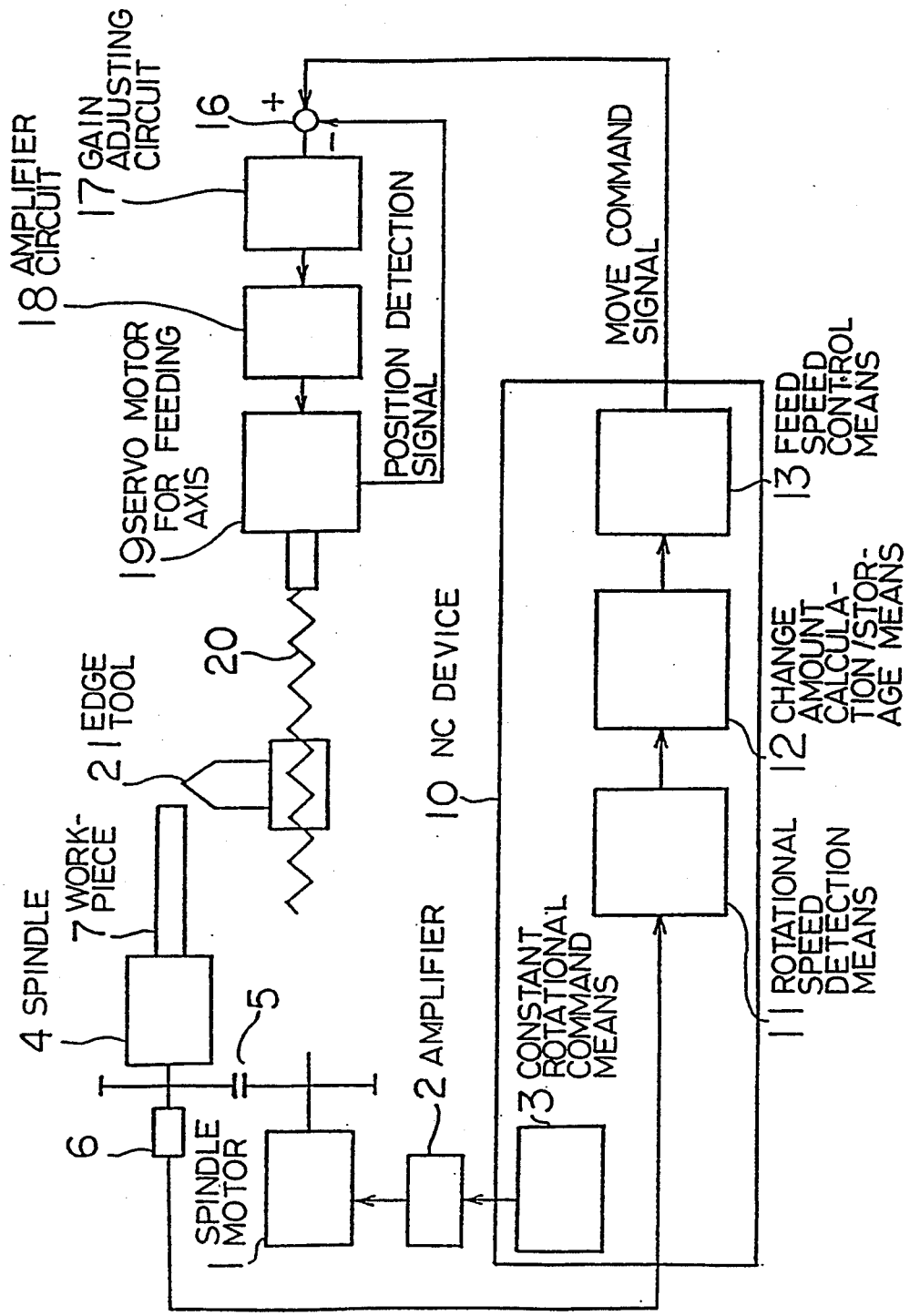
FIG. 1 is a block diagram schematically showing an NC device of the present invention and peripheral equipment for executing thread cutting.

FIG. 1 is a block diagram schematically showing an NC unit according to an embodiment of the present invention and peripheral equipments for executing thread cutting. A spindle motor 1 is rotated in accordance with an output of an amplifier 2. The amplifier 2 inputs a constant rotation command signal, which is outputted from constant rotation command means 3 in the NC unit 10, and outputs a current corresponding to this signal to the spindle motor 1, thus rotating the spindle motor 1 at a constant rotational speed. A tacho-generator (not shown) which generates a voltage signal corresponding to a rotation speed of the motor is attached to the spindle motor 1. The voltage signal generated from the tacho-generator is fed back to the amplifier 2 as a speed feedback signal.

A spindle 4 is connected to an output shaft of the spindle motor 1 through a gear 5. Therefore, the spindle 4 is rotated at the rotational speed corresponding to a gear ratio of the gear 5. A position coder 6 for detecting a position of the spindle is arranged in the spindle 4. Further, a workpiece 7 which is subjected to the thread cutting is attached to the spindle 4. A single rotation signal pulse and speed detection pulse are fetched from the position coder 6 to rotational speed detection means 11 in the NC device 10.

The rotational speed detection means 11 detects the rotational speed S of the spindle motor 1 in synchronism with an ITP signal (interpolation signal) generated in the NC device 10. The ITP signal is a signal for controlling exchanges of data between the NC unit 10 and servo-controlled peripheral equipments, the ITP signal being generated at intervals of a cycle of 8 ms, for example. If the rotational speed S of the spindle motor 1 detected by the rotational speed detection means 11 is changed in a certain ITP signal cycle, the change amount calculation/storage means 12 calculates an amount of change ΔS in the rotational speed S and stores the calculated value.

Feed speed control means 13 calculates a feed speed command F at intervals of the ITP signal cycle on the basis of data obtained by correcting the rotational speed S detected by the rotational speed detection means 11 in accordance with the changed amount ΔS, and outputs a move command signal in accordance with the feed speed command F, thereby controlling a tool feed speed. The move command signal is inputted to a difference detector 16, and the difference between the move command signal and a positional detection signal fed back to the difference detector 16 is calculated therein. A gain adjusting circuit 17 amplifies the difference and outputs it to an amplifier circuit 18. A servo motor for a feed axis 19 is driven by an output from the amplifier circuit 18, thereby rotating a ball screw 20. An edge tool (tool for thread cutting) 21 is moved in the z-axis direction in accordance with rotation of the ball screw 20. A pulse coder included in the servo motor for the feed axis 19 outputs the position detection signal which is fed back to the difference detector 16. A linear scale may be used in place of the pulse coder.

Next, a control of the feed speed according to the device of the embodiment in a case where the rotational speed S of the spindle motor 1 lowers is described with reference to timing diagrams shown in FIG. 2.

In order to execute thread cutting by means of the NC device, a tool feed speed which changes in proportion to an actual speed of the spindle motor must be commanded. However, in fact, the tool feed speed is calculated on the basis of the rotational speed of the spindle motor detected a constant time before, so that a delay time occurs in commanding the tool feed speed. Therefore, when the rotational speed of the spindle motor lowers suddenly at the moment the workpiece is started to be subjected to thread cutting by the tool, the command at a value greater than a correct value for the tool feed speed is outputted.

Here, the ITP signal cycle is generated in the NC device 10 at intervals of a cycle of L (ms), and the rotational speed S (rpm) of the spindle motor is equal to $S_0$ until the time point of $t_0$ so that the spindle motor is rotated at the constant speed, Thereafter, the rotational speed is gradually lowered to $S_1$ ($t_1$), $S_2(t_2)$, $S_3(t_3)$, $S_4(t_4)$, and $S_5(t_5)$, in the named order, After the time point of $t_5$, the spindle motor returns again to a state where it is rotated at a constant speed. Although the rotational speed $S_0$ at the time point of $t_0$ is fetched to the NC unit 10, the feed speed command F is calculated at the time point of $t_1$ one cycle delayed therefrom, and the actual move command signal is generated. For this reason, an expected rotational speed SS of the spindle motor is calculated, as data obtained by correcting the rotational speed S detected by the rotational speed detection means according to the changed amount ΔS, by the following equation:

$$SS_i = S_{i-1} + \Delta S$$
$$= S_{i-1} + (S_{i-1} - S_{i-2}).$$

The tool feed speed command F is calculated on the basis of the expected rotational speed SS by the following equation:

$$F_i = SS_i \times (1/60) \times P.$$

Figure 2:
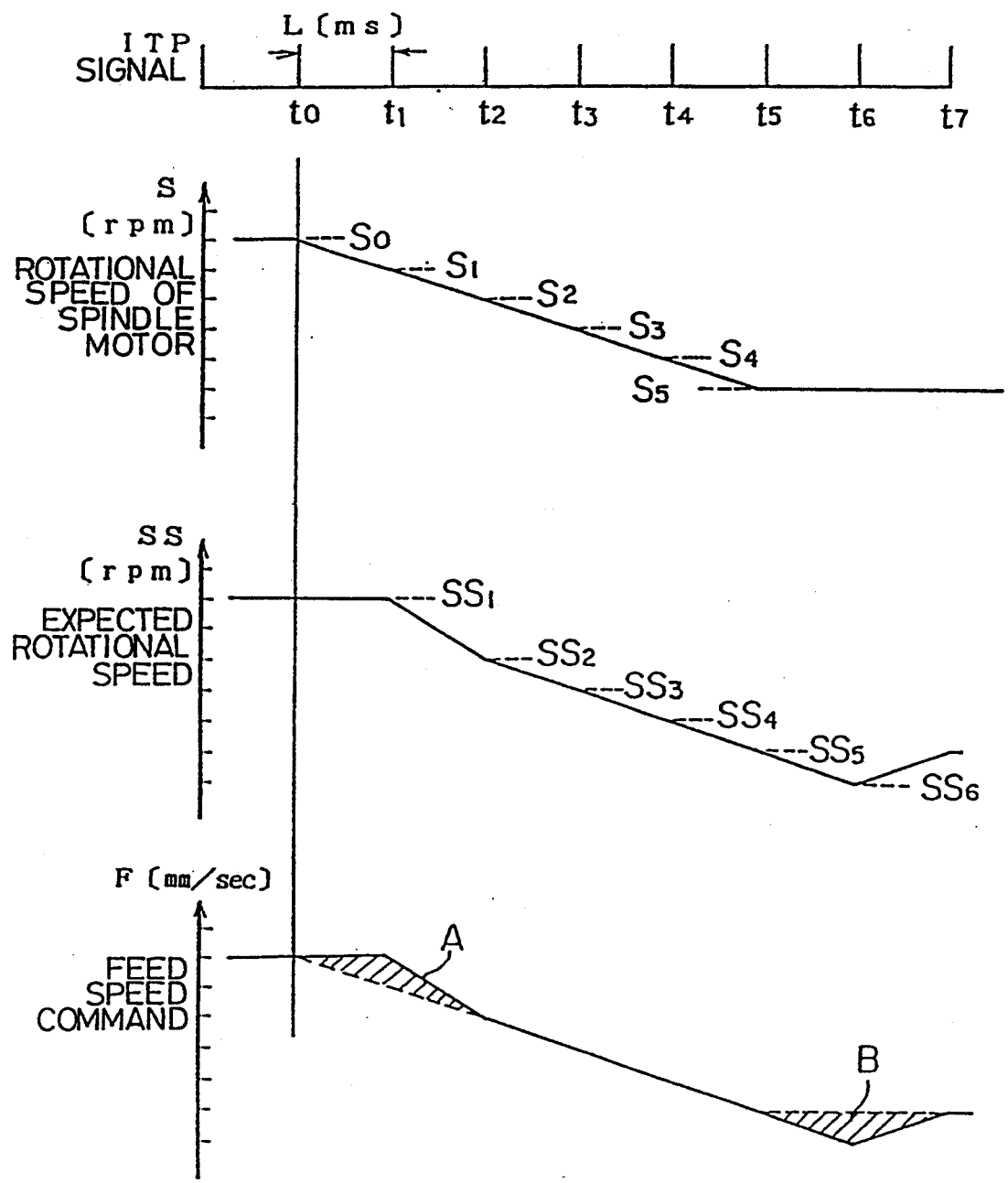
FIG. 2 is a timing diagram explaining a control for a feed speed effected by the device according to an embodiment of the present invention.

When thread cutting is performed on the basis of the expected rotational speed SS shown in FIG. 2, errors in a tool moving amount are indicated by areas Ea and Eb of hatched portions A and B. Dimensions of these errors are obtained by the following equations, respectively:

$$Ea = +(1/60) \cdot \Delta S \cdot L$$

$$Eb = -(1/60) \cdot \Delta S \cdot L.$$

Absolute values of these areas Ea and Eb are equal to each other, and therefore, it can be understood that accumulative errors in thread cutting become zero. In this case, however, only errors in the tool moving amount resulting from errors in the speed command are considered, whereas errors resulting from a delay caused by a servo time constant or the like are not considered.

Moreover, as seen from FIG. 2, errors in the feed speed command F appear as a positive error in the tool moving amount, indicated by the hatched portion A, between the time point of $t_0$ at which the rotational speed S begins to lower and the time point of $t_2$, and as a negative error in the tool moving amount, indicated by the hatched portion B, between the time point $t_5$ at which the rotational speed S returns to a constant speed and the time point $t_7$. Namely, the feed speed command F generated in the NC unit 10 between the time point $t_2$ and the time point $t_5$ corresponds to the actual rotation of the spindle regardless of the delay of one ITP signal cycle, so that errors do not occur in the tool moving amount.

Figure 3:
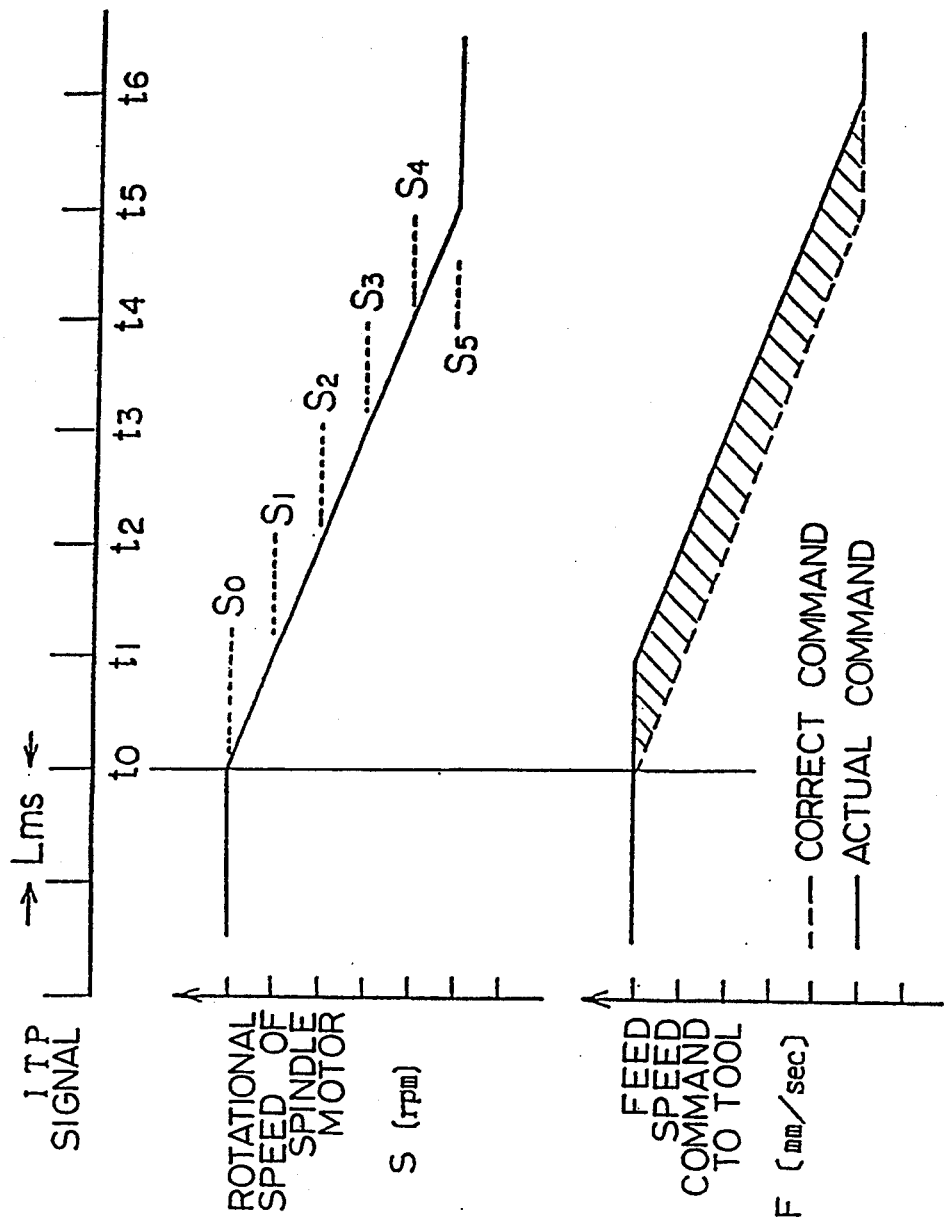
FIG. 3 (PRIOR ART) is a diagram showing an error in a tool move amount caused in thread cutting according to the conventional NC device.

FIG. 3 (PRIOR ART) is a diagram explaining errors caused when the rotational speed S Lowers between the time point $t_0$ and the time point $t_5$. As in the case of FIG. 2, the hatched portion indicates errors in the tool moving amount caused by thread cutting according to the conventional NC unit.

For the purpose of comparison, an area E of the hatched portion is calculated with an assumption that the rotational speed S lowers in the same manner as in the case of FIG. 2, the calculated result being represented as follows:

$$E = +(1/12) \cdot \Delta S \cdot L.$$

As will be understood from the foregoing explanations, according to the NC device of the present invention, the rotational speed is corrected so that a proper feed speed is commanded, thereby reducing errors of the tool moving amount to 1/5.

By way of example, a calculation is made to determine errors caused in a thread groove in a case where the ITP cycle L of the NC device 10 is 8 ms, and the rotational speed S of the spindle 4 changes from 2,000 (rpm) to 1,975 (rpm) by a decrease of 25 (rpm) during 5 ITP signal cycles at an initial stage of the thread cutting to form a thread at a thread pitch of 2 mm.

According to the present invention shown in FIG. 2, the rotational speed of the spindle is predicted, whereby the feed speed command F at the time point $t_1$, which command should be naturally at 66.50 mm/s, is in fact at 66.67 mm/s, so that an error of +1.33 μm equivalent to the area Ea of the hatched portion A i s produced. Further, the feed speed command F at the time point $t_6$, which should be naturally at 65.83 mm/s, is in fact at 65.67 mm/s, so that an error of −1.33 μm equivalent to the area Eb of the hatched portion B is generated. However, unlike the present invention, according to the conventional device executing no correction, the actual command becomes greater than a proper command between the time point $t_1$ at which the rotational speed starts to lower and the time point $t_5$, as shown in FIG. 3. For this reason, an error caused in the thread groove is 6.67 μm which is five times as much as an error caused in the present invention. Therefore, in the case of using the device of the present invention in thread cutting, 60% of a single error can be eliminated, and accumulative errors in the tool moving amount can be eliminated.

In the foregoing explanations, the workpiece which is rotated by the spindle is subjected to thread cutting. Further, the NC unit of the present invention can be widely employed when commanding a feed speed of a tool for machining a workpiece in accordance with an actual speed of a spindle.

As described above, the NC unit of the present invention is so constituted as to predict an actual rotational speed of the spindle when the actual spindle rotational speed is suddenly changed, whereby the feed speed command is properly controlled. This makes it possible to accurately command the feed speed of the tool, so that high accurate machining is achieved.

It is claimed:

1. An numerical control (NC) device where a feed speed of a tool for machining a workpiece is commanded synchronously with an actual speed of a spindle which causes the workpiece to rotate, the device comprising:

detection means for detecting a rotational speed of the spindle;

calculation means for calculating an expected rotational speed of the spindle based on an amount of change in the rotational speed detected by said detection means when the rotational speed has changed; and feed speed control means for controlling the feed speed of the tool based on said expected rotational speed, said calculation means receiving the detected rotational speed from said detection means and then calculating said expected rotational speed in synchronism with a timing signal at which a move command is outputted from said feed speed control means using the following equation:

$$SS_i = S_{i-1} + \Delta S$$
$$= S_{i-1} + (S_{i-1} - S_{i-2})$$

($SS_i$: expected rotational speed of the spindle,
$S_{i-1}$: rotational speed of the spindle detected by the detection means,
$S_{i-2}$: rotational speed of the spindle detected by the detection means at one previous timing).

2. The numerical control (NC) device according to claim 1, wherein when subjecting the workpiece to thread cutting by the tool, said feed speed control means calculates the feed speed of the tool based on a pitch width commanded for said thread cutting.

* * * * *

UNITED STATES PATENT AND TRADEMARK OFFICE
CERTIFICATE OF CORRECTION

PATENT NO. : 5,404,308
DATED : April 4, 1995
INVENTOR(S) : M. Kajiyama

It is certified that error appears in the above-indentified patent and that said Letters Patent is hereby corrected as shown below:

TITLE PAGE

Insert --PCT Filed: September 1, 1992--;

Insert --PCT No.: PCT/JP92/01116--;

Insert --PCT Publication No.: WO93/04817--;

Insert --PCT Publication Date: March 18, 1993--;

Signed and Sealed this

Twenty-third Day of January, 1996

Attest:

BRUCE LEHMAN

Attesting Officer     Commissioner of Patents and Trademarks